US011977343B2

(12) United States Patent
Yu et al.

(10) Patent No.: US 11,977,343 B2
(45) Date of Patent: May 7, 2024

(54) CONSUMABLE CHIP, CONSUMABLE AND COMMUNICATION METHOD

(71) Applicant: Zhuhai Pantum Electronics Co., Ltd., Zhuhai (CN)

(72) Inventors: Chengzhu Yu, Zhuhai (CN); Dan Ning, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/335,271

(22) Filed: Jun. 15, 2023

(65) Prior Publication Data

US 2023/0359136 A1 Nov. 9, 2023

Related U.S. Application Data

(63) Continuation-in-part of application No. 17/722,046, filed on Apr. 15, 2022, now Pat. No. 11,709,440.

(30) Foreign Application Priority Data

Apr. 22, 2021 (CN) ......................... 202110437017.3

(51) Int. Cl.
*G06F 3/12* (2006.01)
*G03G 15/08* (2006.01)

(52) U.S. Cl.
CPC ................................ *G03G 15/0863* (2013.01)

(58) Field of Classification Search
None
See application file for complete search history.

(56) References Cited

U.S. PATENT DOCUMENTS

| | | | |
|---|---|---|---|
| 7,249,108 | B1 | 7/2007 | Walmsley et al. |
| 9,770,915 | B1 | 9/2017 | Ness et al. |
| 10,295,946 | B2 | 5/2019 | Testardi |
| 2003/0172268 | A1 | 9/2003 | Walmsley |
| 2006/0098993 | A1 | 5/2006 | Yang |

(Continued)

FOREIGN PATENT DOCUMENTS

| | | | |
|---|---|---|---|
| CN | 109298615 | A | 2/2019 |
| CN | 110481155 | A | 11/2019 |

(Continued)

*Primary Examiner* — Dung D Tran
(74) *Attorney, Agent, or Firm* — Anova Law Group, PLLC

(57) ABSTRACT

The present disclosure provides a consumable, a consumable chip, and a communication method between the image forming apparatus and the consumable chip. The consumable chip is capable of being installed on a consumable, and the consumable is capable of being detachably installed on an image forming apparatus. The consumable chip includes a storage unit and a chip control unit. The storage unit is configured to store identity authentication information of the consumable. The chip control unit is configured to receive an authentication request sent by the image forming apparatus and obtain second time information, generate a second code by performing a calculation using a preset algorithm according to the obtained second time information and the pre-stored identity authentication information of the consumable, and send the second code to the image forming apparatus. The second code is configured to determine whether the consumable meets expectation.

12 Claims, 4 Drawing Sheets

(56) References Cited

U.S. PATENT DOCUMENTS

| | | | | |
|---|---|---|---|---|
| 2012/0134686 | A1 | 5/2012 | Jones et al. | |
| 2012/0134687 | A1 | 5/2012 | Jones | |
| 2013/0321853 | A1 | 12/2013 | Lee et al. | |
| 2014/0205095 | A1 | 7/2014 | Ittogi | |
| 2015/0082427 | A1 | 3/2015 | Ivanchykhin et al. | |
| 2017/0075277 | A1* | 3/2017 | Kanakubo ............ | G03G 15/556 |
| 2018/0224787 | A1 | 8/2018 | Zhang et al. | |
| 2020/0314082 | A1 | 10/2020 | Enomoto | |
| 2021/0312021 | A1 | 10/2021 | Enomoto | |
| 2022/0019156 | A1* | 1/2022 | Kim ..................... | H04N 1/2376 |

FOREIGN PATENT DOCUMENTS

| | | | |
|---|---|---|---|
| CN | 112099324 | A | 12/2020 |
| CN | 112180699 | A | 1/2021 |

* cited by examiner

CONSUMABLE CHIP, CONSUMABLE AND COMMUNICATION METHOD

CROSS-REFERENCE TO RELATED APPLICATION

This application is a continuation-in-part application of U.S. patent application Ser. No. 17/722,046, filed on Apr. 15, 2022, which in turn claims the priority of Chinese patent application No. 202110437017.3, filed on Apr. 22, 2021, the entirety of all of which is incorporated herein by reference.

FIELD OF THE DISCLOSURE

The present disclosure generally relates to the field of image forming technology and, more particularly, relates to a consumable, a consumable chip, and a communication method between the image forming apparatus and the consumable chip.

BACKGROUND

With the continuous development of imaging technology, an image forming apparatus such as a copier, a printer, a facsimile machine, a word processor, etc., has been widely applied. Such image forming apparatus needs to use a consumable for image forming work, to print an image or text on an image forming medium (e.g., paper, etc.). When the consumable is used up, the image forming apparatus is capable of continuing to be used by merely replacing or adding a new consumable.

To obtain a desired output effect, the image forming apparatus uses the specified consumable that meets the predetermined quality to guarantee the output. The replaceable characteristics of the consumable makes it possible for a non-designated consumable to be used on the image forming apparatus. To identify whether a consumable is a designated consumable that meets the predetermined quality, the image forming apparatus needs to communicate with the consumable and uses the communication information for authentication. After the authentication is successful, the consumable is allowed to be used for imaging. The information used for authentication may be a preset consumable model, a serial number of a consumable chip, information on the remaining amount of consumable, etc. When a consumable is installed on the image forming apparatus, the image forming apparatus reads the corresponding information, and then starts the authentication process to authenticate the consumable. After the authentication is successful, the consumable is used for imaging, otherwise, the consumable is not allowed to be used for imaging.

However, the conventional method of performing authentication through the consumable model, serial number, information on the remaining amount of consumable, etc., is substantially simple, and the rules are substantially stable, which tends to be cracked when being used as verification information for authentication. The security and reliability of using such authentication method for authentication is substantially low, and the use of the consumable that does not meet the predetermined quality requirements may cause the image forming apparatus to be damaged and the output quality of the image forming apparatus to be degraded.

BRIEF SUMMARY OF THE DISCLOSURE

One aspect of the present disclosure provides a consumable chip. The consumable chip is capable of being installed on a consumable, and the consumable is capable of being detachably installed on an image forming apparatus. The consumable chip includes a storage unit and a chip control unit. The storage unit is configured to store identity authentication information of the consumable. The chip control unit is configured to receive an authentication request sent by the image forming apparatus and obtain second time information, generate a second code by performing a calculation using a preset algorithm according to the obtained second time information and the pre-stored identity authentication information of the consumable, and send the second code to the image forming apparatus. The second code is configured to determine whether the consumable meets expectation.

Another aspect of the present disclosure provides a consumable. The consumable includes a housing, a developer container unit disposed in the housing and configured to contain the developer, and a consumable chip. The consumable chip is capable of being installed on the consumable, and the consumable is capable of being detachably installed on an image forming apparatus. The consumable chip includes a storage unit and a chip control unit. The storage unit is configured to store identity authentication information of the consumable. The chip control unit is configured to receive an authentication request sent by the image forming apparatus and obtain second time information, generate a second code by performing a calculation using a preset algorithm according to the obtained second time information and the pre-stored identity authentication information of the consumable, and send the second code to the image forming apparatus. The second code is configured to determine whether the consumable meets expectation.

Another aspect of the present disclosure provides a consumable. The consumable includes an organic photoconductor, a charging roller configured to charge the organic photoconductor, and a consumable chip. The consumable chip is capable of being installed on the consumable, and the consumable is capable of being detachably installed on an image forming apparatus. The consumable chip includes a storage unit and a chip control unit. The storage unit is configured to store identity authentication information of the consumable. The chip control unit is configured to receive an authentication request sent by the image forming apparatus and obtain second time information, generate a second code by performing a calculation using a preset algorithm according to the obtained second time information and the pre-stored identity authentication information of the consumable, and send the second code to the image forming apparatus. The second code is configured to determine whether the consumable meets expectation.

Another aspect of the present disclosure provides a communication method between an image forming apparatus and a consumable chip, applied to the image forming apparatus and the consumable chip. The image forming apparatus is detachably installed with a consumable, the consumable is installed with the consumable chip, the image forming apparatus includes an image forming control unit, and the consumable chip includes a chip control unit. The communication method includes sending, by the image forming control unit, an authentication request to the consumable chip, obtaining, by the image forming control unit, first time information, and generating, by the image forming control unit, a first code by performing a calculation using a preset algorithm according to the obtained first time information and pre-stored identity authentication information of the consumable. The communication method also includes after receiving the authentication request, obtaining, by the chip control unit, second time information, generating, by the chip control unit, a second code by performing a calculation using a preset algorithm according to the obtained second time information and the pre-stored identity authentication information of the consumable, and sending, by the chip control unit, the second code to the image forming control unit. Further, the communication method includes after receiving the second code, determining, by the image forming control unit, whether the first code and the second code are consistent, to determine whether the consumable meets expectation.

Another aspect of the present disclosure provides an image forming apparatus. The image forming apparatus is installed with a consumable, and the consumable is installed with a consumable chip. The image forming apparatus includes an image forming control unit. The image forming control unit is configured to send an authentication request to the consumable chip and obtain first time information, and generate a first code by performing a calculation using a preset algorithm according to the obtained first time information and pre-stored identity authentication information of the consumable. The image forming control unit is also configured to receive a second code fed back by the consumable chip. The second code is generated by performing a calculation using a preset algorithm according to second time information obtained by the consumable chip and the pre-stored identity authentication information of the consumable. Further, the image forming control unit is configured to determine whether the first code and the second code are consistent, to determine whether the consumable meets expectation.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions in the disclosed embodiments of the present disclosure, drawings to be used in the description of the disclosed embodiments will be briefly described below. It is obvious that the drawings in the following description are certain embodiments of the present disclosure, and other drawings may be obtained by a person of ordinary skill in the art in view of the drawings provided without creative efforts.

DETAILED DESCRIPTION

To more clearly illustrate aims, technical solutions, and advantages of the disclosed embodiments of the present disclosure, the technical solutions in the disclosed embodiments of the present disclosure will be clearly and fully described with reference to the accompanying drawings in the disclosed embodiments of the present disclosure. Obviously, the described embodiments are some but not all of the embodiments of the present disclosure. Based on the disclosed embodiments of the present disclosure, persons of ordinary skill in the art may derive other embodiments without creative efforts, all of which are within the scope of the present disclosure.

The present disclosure provides an image forming apparatus, a consumable chip and a communication method between the image forming apparatus and the consumable chip. Each of a body side of the image forming apparatus and a chip side may include an electrical contact portion. When the consumable is installed on the image forming apparatus, the electrical contact portion on the body side of the image forming apparatus may be in contact with the electrical contact portion of the chip side. The electrical contact portion may include a conductive plane, a conductive probe, a conductive coil, etc. The image forming apparatus may be configured to perform an image forming job, such as generating, printing, receiving and transmitting image data. The image forming apparatus may include an ink jet printer, a laser printer, a light-emitting diode (LED) printer, a copier, a facsimile machine, a scanner, an all-in-one multifunctional machine, and a multi-functional peripheral (MFP) that performs the above functions in a single device. The image forming apparatus may include an image forming control unit and an image forming unit. The image forming control unit may be configured to control the entire image forming apparatus, and the image forming unit may be configured to form an image on the supplied paper under the control of the image forming control unit based on the image data.

Figure 1:
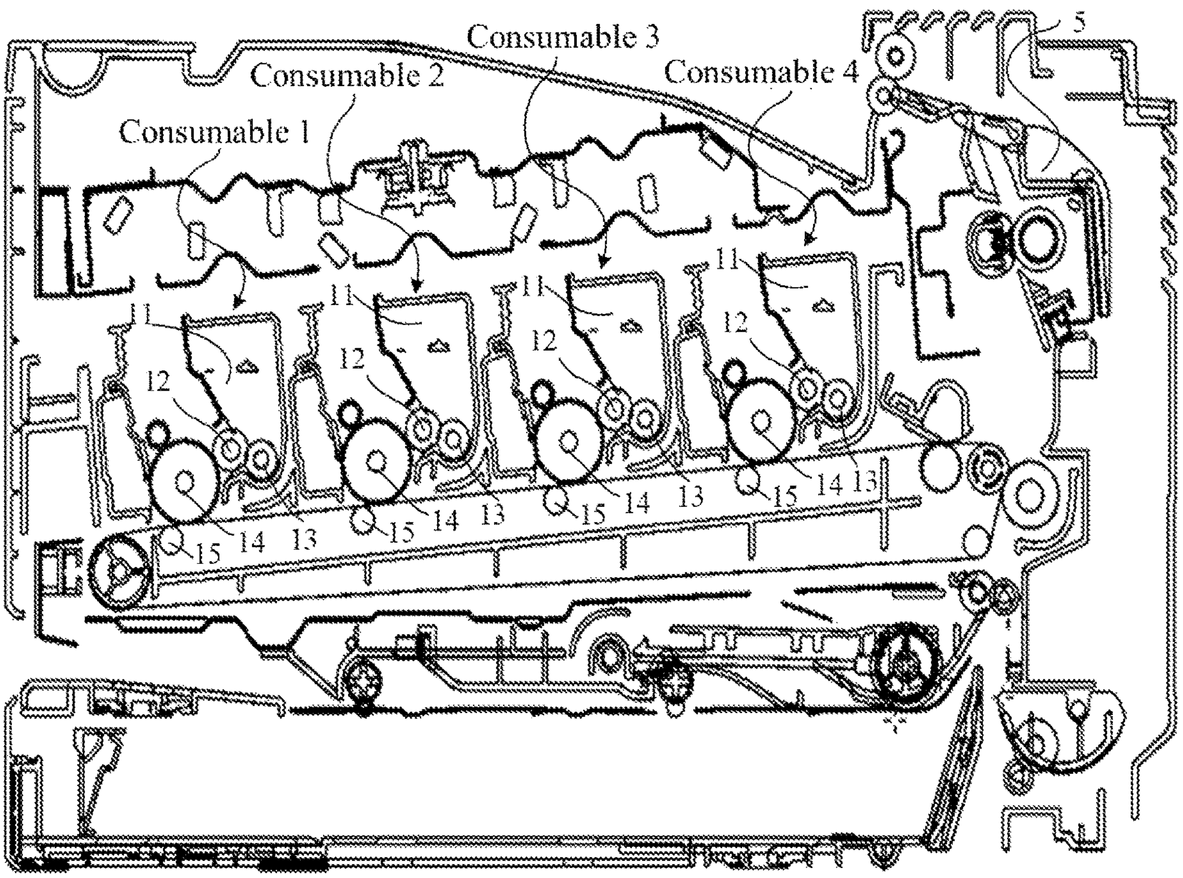
FIG. 1 illustrates a schematic diagram of an exemplary image forming apparatus consistent with an embodiment of the present disclosure.

FIG. 1 illustrates a schematic diagram of an image forming apparatus consistent with an embodiment of the present disclosure. Referring to FIG. 1, as an example of the image forming apparatus, the image forming unit of the image forming apparatus may include: a developer container unit 11, a developing unit 12, a developer conveying unit 13, a photosensitive unit 14, a transfer unit 15 and a fixing unit 5, etc. The to-be-printed paper may move towards a paper feeding direction, may successively undergo a toner feeding operation of the developer conveying unit 13 and a developing operation of the developing unit 12, may reach a clamping region between the photosensitive unit 14 and the transfer unit 15 for transferring, and then may undergo a fixing operation of the fixing unit 5 to complete the image forming operation. The developer container unit 11 may be configured to contain developer, and the developer may include colorful toner, toner and any other material. The developing unit 12 may include a developing roller and any other component. The developer conveying unit 13 may include a powder feeding roller and any other component. The photosensitive unit 14 may include an organic photoconductor drum, a charging roller and any other component, and the charging roller may be configured to charge the organic photoconductor drum.

The image forming apparatus may often include at least one consumable that is capable of being detachably installed on the image forming apparatus. The image forming apparatus shown in FIG. 1 may be used as an example, four consumables (consumable 1, consumable 2, consumable 3, and consumable 4, respectively as shown in FIG. 1) may be detachably installed on the image forming apparatus. The four consumables may be configured to provide developer of four colors of black K, cyan C, magenta M, and yellow Y, respectively, for the image forming apparatus. In another embodiment, a quantity of consumables installed on the image forming apparatus may increase or decrease, for example, the quantity may include one or six, which may not be limited by the present disclosure.

In one embodiment, the consumable may have a split structure, and may include a developing cartridge and a drum cartridge. The developing cartridge and the drum cartridge may be disassembled respectively. The developing cartridge may include a developing cartridge chip, and the drum cartridge may include a drum cartridge chip. The developing cartridge chip and the drum cartridge chip may be configured to store information such as toner content and a quantity of printed pages, respectively. In one embodiment, the developing cartridge may include a housing, the developer container unit 11, the developing unit 12 and the developer conveying unit 13. The developer container unit 11 may be located in the housing for containing the developer, and the developer conveying unit 13 may be configured to convey the developer. The drum cartridge may include the photosensitive unit 14, etc.

In another embodiment, the consumable may have an all-in-one structure. For example, the consumable (consumable 1, consumable 2, consumable 3 or consumable 4) may include the developer container unit 11, the developing unit 12, the developer conveying unit 13, the photosensitive unit 14, and the transfer unit 15, etc. In other words, in the present disclosure, the consumable with the all-in-one structure may often include one consumable chip. The consumable with the split structure may often include two consumable chips, which may be installed in the developing cartridge and the drum cartridge, respectively.

It should be noted that the consumable in the disclosed embodiments may be the above-mentioned developing cartridge or the above-mentioned drum cartridge, or may include both the developing cartridge and the drum cartridge, which may not be limited herein. The consumable in the disclosed embodiments may include any other component, part, and unit in the image forming apparatus that tends to be damaged and needs to be replaced, such as a paper cassette, a toner cylinder, etc. Correspondingly, the above-mentioned consumable chip may be installed on the above-mentioned consumable, and the consumable chip may be configured to record the state of the consumable to facilitate the image forming apparatus to centrally manage the consumables installed thereon. The consumable chip may store related information of the consumable, such as product model, color/type and production date of a recording material (such as ink, toner), usage information of printing media (such as toner, paper, etc.), a quantity of printed pages, serial number, etc. At the same time, the consumable chip may be authenticated by the image forming apparatus, to prevent the image forming apparatus from using consumable that cannot meet the predetermined quality requirements to perform imaging.

An existing image forming apparatus often performs authentication through consumable model, serial number, and information on the remaining amount of consumable, etc. The authentication method is substantially simple, and the rules are substantially stable, which tends to be cracked when being used as verification information for authentication. The use of consumables that cannot meet the predetermined quality requirements may cause the image forming apparatus to be damaged and the output quality of the image forming apparatus to be degraded.

The present disclosure provides an image forming apparatus. The image forming apparatus may be installed with a consumable, and the consumable may be installed with a consumable chip. The image forming apparatus may include an image forming control unit. The image forming control unit may be configured to send an authentication request to the consumable chip and obtain first time information, and may be configured to generate a first code by performing a calculation using a preset algorithm according to the acquired first time information and the pre-stored identity authentication information of the consumable. At the same time, the image forming control unit may be configured to receive a second code fed back by the consumable chip, and may determine whether the first code and the second code are consistent, and then to determine whether the consumable meets the requirements. The second code may be generated by performing a calculation using a preset algorithm according to second time information acquired by the consumable chip and the identity authentication information of the consumable pre-stored by the consumable chip. The second code is the same as the result calculated by the preset algorithm (assumed to be the first algorithm) based on the second time information and the consumable identity authentication information.

Based on the second time information and consumable identity authentication information, the result generated by the preset algorithm is the same as any of the following calculation results:

The result calculated by the second algorithm based on the transformation information corresponding to the second time information and consumable identity authentication information;

The result calculated by the third algorithm based on the second time information and the transformation information corresponding to the consumable identity authentication information;

The result calculated by the fourth algorithm based on the transformation information corresponding to the second time information and the transformation information corresponding to the consumable identity authentication information.

Wherein, the transformation information corresponding to the second time information is the result obtained by calculating the second time information according to the preset conversion algorithm (the first conversion algorithm). The transformation information corresponding to the consumable identity authentication information is the result obtained by calculating the consumable identity authentication information according to the preset conversion algorithm (the second conversion algorithm). Among them, the first conversion algorithm and the second conversion algorithm can be the same or different, so it is not limited here.

In other words, the consumable chip can not only generate the second code based on the second time and consumable identity authentication information by using the first algorithm, but also use other ways to generate the second code. The embodiment of the present disclosure does not limit the specific way of calculating the second code of the consumable chip. As long as the code value generated by the consumable chip is the same as the result generated by the consumable chip based on the second time and consumable identity authentication information using the first algorithm.

Further, after determining that the first code and the second code are consistent, it may be determined that the consumable meets the requirements, and the consumable may be allowed to be used for imaging. After determining that the first code and the second code are not consistent, it may be determined that the consumable does not meet the requirements, and the consumable may not be allowed to be used for imaging. The identity authentication information of the consumable may include consumable serial number, consumable production date, consumable ID, consumable production batch number, consumable type information, consumable color characteristic information, consumable capacity information, imaging date, consumable remaining amount, consumable consumption and manufacturer information, etc.

In one embodiment, the image forming apparatus may be provided with a timer for timing, and the image forming control unit may acquire the first time information from the timer provided in the image forming apparatus. The first time information may be the time for the image forming apparatus to send authentication request. It should be understood that in certain embodiments, the first time information used for calculating the first code this time may also be time information obtained by the image forming control unit in the last power-on cycle. One power-on cycle may refer to the time period from when the image forming apparatus is connected to the power supply until the image forming apparatus is disconnected from the power supply. In other words, the image forming apparatus may need to be connected to the city power to operate normally, and the one power-on cycle may refer to the time period from power-on to power-off. Of course, the first time information sent by the image forming apparatus can also be a time determined by the image forming apparatus by other means.

In this embodiment, when the system clock is set in the image forming apparatus, the system clock starts when the image forming apparatus is turned on, and the system clock starts timing when the image forming apparatus is turned on. When authentication is required, the time information up to the moment of the first authentication is taken as the first time information. When the second, third and subsequent authentication are required, the system time information during the second, third and subsequent authentication is taken as the first time information respectively to calculate the first code. Among them, the time to be authenticated above refers to the time when the image forming apparatus sends authentication request to the consumable chip, and can also be a certain time determined by other means by the image forming apparatus.

In this embodiment, when the image forming apparatus is connected to the external terminal (such as mobile phone, computer, etc.), when the image forming apparatus needs to be authenticated, that is, when the image forming apparatus sends authentication request to the consumable chip, the time information recorded by the terminal is obtained from the external terminal as the first time information for calculating the first code. Of course, the first time can also be determined by other means for the image forming apparatus.

In this embodiment, when the image forming apparatus is connected to the network, when the image forming apparatus sends authentication request to the consumable chip, the time information recorded on the current network is obtained as the first time information for calculating the first code. Specifically, the time recorded on the current network can be the time recorded on the router connected to the image forming apparatus or the built-in mobile communication module such as 2G, 3G, 4G, 5G, wireless network module or wired network module in the image forming apparatus. Of course, the first time can also be a time determined by other means by the image forming apparatus.

In this embodiment, the image forming apparatus can also be timed from the beginning of the consumable chip power-up. When authentication is required, that is, when the image forming apparatus sends authentication request to the consumable chip, the time information up to the moment of the first authentication is used as the first time information to calculate the first code. When the first time information is needed to calculate the second code, the image forming apparatus sends a command of reading time to the consumable chip. After receiving the command of reading time, the consumable chip obtains the information of the current moment when the consumable chip is powered on to the system that receives the authentication request as the first time information to calculate the first code. Of course, the first time can also be a time determined by other means by the image forming apparatus.

Further, before the image forming control unit is configured to determine whether the first code and the second code are consistent, the image forming control unit may also be configured to determine whether the second code is received within a preset time period, and to determine whether the second code is invalid. After determining that the second code is invalid or the second code is not received within the preset time period, another authentication request may be sent to the consumable chip again to obtain the second code generated by the consumable chip. Determining whether the second code is received within the preset time period may include: when the image forming control unit sends an authentication request, starting timing; when the image forming control unit receives the second code, ending the timing; calculating the time period required by the image forming control unit from sending the authentication request to receiving the second code; and determining whether the time period is within the preset time period. Determining whether the second code is invalid may include: starting timing when the image forming control unit receives the second code; ending the timing when it is ready to determine whether the first code and the second code are consistent; calculating the time period and determining whether the time period is within the preset time period; and determining that the second code is invalid if the time period is not less than the preset time period.

Figure 2:
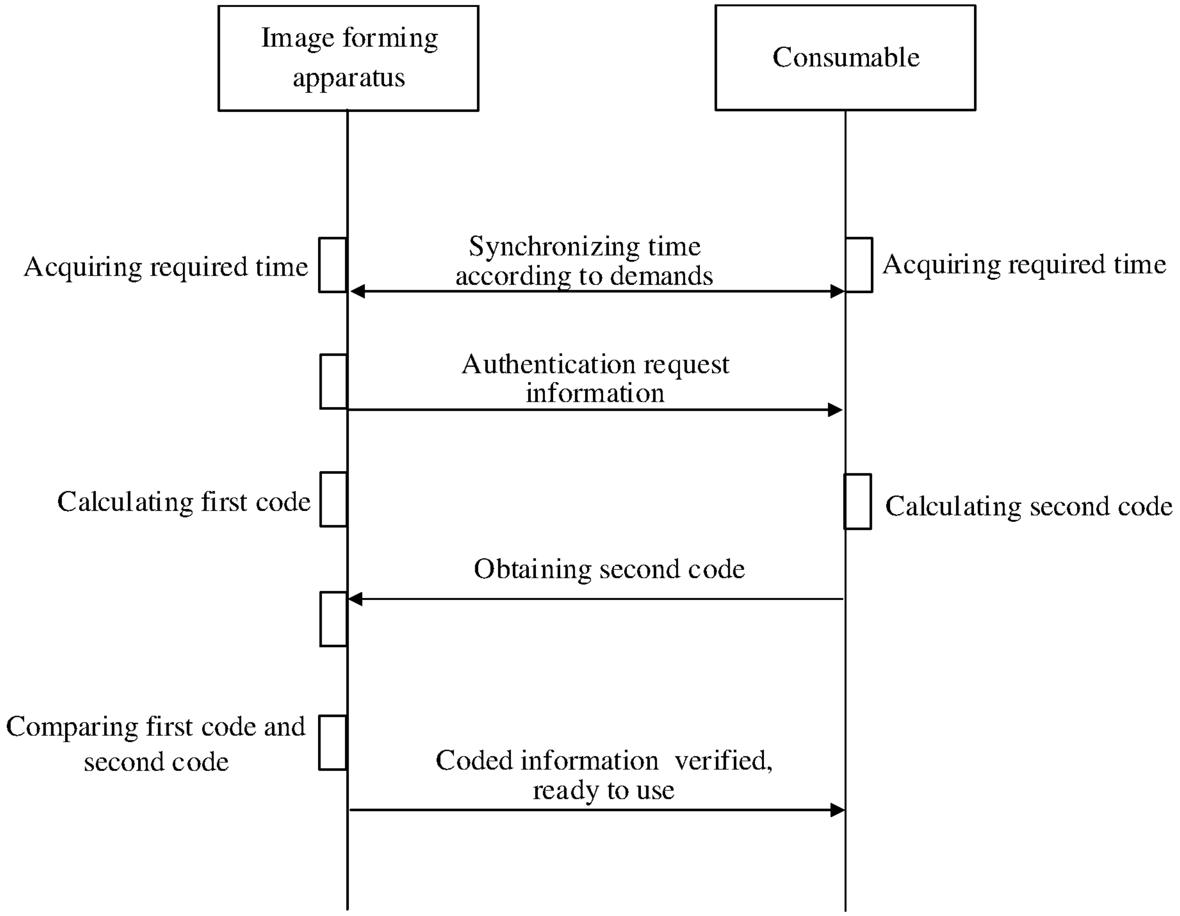
FIG. 2 illustrates a schematic flowchart of an exemplary authentication process between an image forming apparatus and a consumable consistent with an embodiment of the present disclosure.

Referring to FIG. 2, the specific authentication process may include following. Before performing the authentication, the image forming apparatus and the consumable may respectively acquire time parameter information for synchronization. The synchronization may refer to that the image forming apparatus and the consumable may acquire the time parameters respectively, and when the obtained time parameters are the same or the error is less than a predetermined value, the time parameters obtained by the image forming apparatus and the consumable may be considered to be synchronous. Then, the image forming apparatus may send authentication request information to the consumable, and may request the consumable to send the encoded information for authentication. Moreover, the image forming apparatus may generate a first code by performing a calculation using a preset algorithm according to the pre-stored identity authentication information of the consumable and the obtained time parameter information, the consumable chip installed on the consumable may generate the second code by performing a calculation using a preset algorithm according to the pre-stored identity authentication information of the consumable and the obtained time parameter information. The second code may have a certain period of use, and may need to be re-acquired after such period. In addition, the consumable chip may send the second code obtained by calculating to the image forming apparatus within a preset time period. Further, the image forming apparatus may compare whether the first code and the second code are consistent. If the first code and the second code are consistent, it may be determined that the consumable may meet the expectation. If the first code and the second code are inconsistent, it may be determined that the consumable may not meet the expectation.

Figure 3:
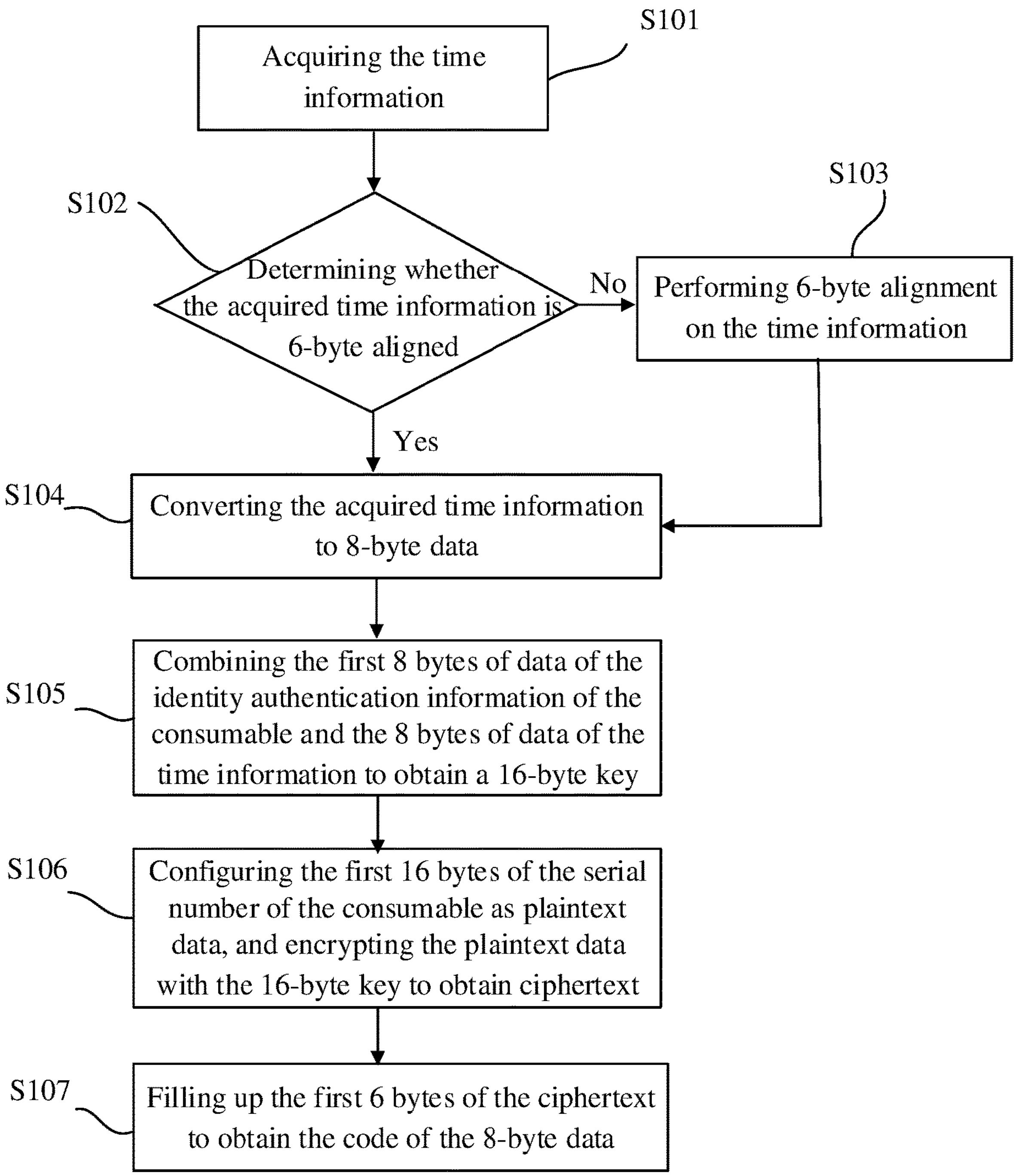
FIG. 3 illustrates a schematic flowchart of an exemplary method for an image forming control unit and a chip control unit to respectively generate codes by calculating consistent with an embodiment of the present disclosure.

Referring to FIG. 3, the method for the image forming control unit to generate the first code by performing a calculation using the preset algorithm according to the pre-stored identity authentication information of the consumable and the obtained first time information, and the method for the chip control unit to generate the second code by performing a calculation using the preset algorithm according to the pre-stored identity authentication information of the consumable and the obtained second time information may include following.

S101: acquiring the time information. The time information may include one of the first time information and the second time information.

S102: determining whether the acquired time information is 6-byte aligned. If the acquired time information is 6-byte aligned, S104 may be performed. If the acquired time information is not 6-byte aligned, after performing S103, S104 may be performed.

S103: performing 6-byte alignment (starting from the low byte) on the time information. For example, the 6-byte alignment may be performed on the time information using the service life information of the consumable, which may not be limited by the present disclosure.

When the time information is not 6-byte aligned, such as the obtained time information is 20:05 on Apr. 1, 2020. When the hexadecimal data is timed based on 1970 and the benchmark corresponds to ms, the corresponding hexadecimal data may include 0xc5, 0xc6, 0x4a, 0x4c. When the time information is less than 6 bytes, 6-byte alignment may be required to obtain the 6-byte data by filling up. In view of this, the service life information of the consumable as the quantity of printed pages may be used as filling up information, such that the data that does not include 6 bytes may be filled up to become 6-byte data. In one embodiment, when the quantity of printed pages is 291, the corresponding hexadecimal data may include 0x01, 0x23. After performing the 6-byte alignment starting from the low byte, the obtained data may include 0xc5, 0xc6, 0x4a, 0x4c, 0x01, 0x23.

S104: converting the acquired time information to 8-byte data.

In one embodiment, the time information may be converted to the 8-byte data through the Base64 processing, which may not be limited herein.

S105: combining the first 8 bytes of data of the identity authentication information of the consumable and the 8 bytes of data of the time information to obtain a 16-byte key.

S106: configuring the first 16 bytes of the serial number of the consumable as plaintext data, and encrypting the plaintext data with the 16-byte key to obtain ciphertext.

In one embodiment, the plaintext data and the 16-byte key may be encrypted by AES to obtain the ciphertext, which may not be limited herein.

S107: filling up the first 6 bytes of the ciphertext to obtain the code of the 8-byte data.

In one embodiment, the first 6 bytes of the ciphertext may be filled up through the Base64 processing to obtain the code of the 8-byte data, which may not be limited herein.

The code obtained by performing a calculation using the first time information may be the first code, and the code obtained by performing a calculation using the second time information may be the second code.

It should be noted that Base64 may be one of the encoding methods used to transmit 8 Bit byte encoding. The Base64 may be configured to convert data and convert the input characters into a~z, A~Z/0~9, +, =, which may introduce redundant data and enhance data security, such that the effect may be similar to encryption. Because the password needs a fixed length, the password may need to be filled up when the length thereof is not enough. The Base64 encoding may be used to fill up the length of the password to obtain the 8-byte data, and the Base64 encoding may be unreadable and may need to be decoded for reading.

The AES may be an international standard encryption algorithm. The encryption algorithm in the present disclosure may not be limited to the AES encryption algorithm, and may include any one of the DES algorithm, the 3DES algorithm, the AES algorithm, and the national secret SM4 algorithm, which may not be limited herein.

The Byte is a unit of measurement used by computer information technology to measure storage capacity, and may also represent data type and language character in certain computer programming language. Byte may be a unit of binary data, and one byte may often be 8-bits long.

Byte alignment may be configured to make various types of data be arranged in space according to certain rules. Because certain platform may merely access some specific types of data from some specific addresses. For example, an error may occur when a CPU with certain architecture accesses a variable that is not aligned, then programming in such architecture may have to ensure byte alignment, and may select a suitable alignment value to align the data according to practical applications.

In the present disclosure, the image forming apparatus and the consumable may be synchronized with the same time parameter, and the time parameter information and the preset identity authentication information may be combined to form the communication data between the image forming apparatus and the consumable chip, which may enhance the difficulty of analyzing the communication data and may improve the security and reliability of the image forming apparatus when authenticating the consumable. At the same time, in the present disclosure, the image forming apparatus and the consumable may be synchronized with the time parameter through a variety of methods. Compared with synchronizing with a fixed time, the complexity of the disclosed embodiments may be substantially high, and the security and reliability of the authentication between the image forming apparatus and the consumable may be substantially high.

In addition, in the disclosed embodiments, the time parameter information and the preset identity authentication information of the consumable may be encoded, and then it may be determined whether the code obtained by the image forming apparatus and the code obtained by the consumable are consistent. Through such process, the image forming apparatus may authenticate the consumable, to ensure that the used consumable is a designated consumable that meets the predetermined quality, thereby improving the output quality of the image forming apparatus, and reducing the damage of the image forming apparatus and the degradation in output quality caused by the use of any other consumable that cannot meet the predetermined quality. Through configuring the image forming apparatus to receive the second code within a preset time period, the risk of password leakage due to the long authentication time period caused by the failure of receiving the authentication information by the image forming apparatus for a long time period. Further, through adding an expiration date used for the second code, the second code may be dynamic and updatable, which may improve the security and reliability when the consumable and the image forming apparatus are authenticated.

On the basis of the above embodiments, the present disclosure also provides a consumable chip. The consumable chip may be installed on the consumable, and the consumable may be detachably installed on the image forming apparatus. The consumable chip may include a storage unit and a chip control unit. The storage unit may be configured to store the identity authentication information of the consumable. The chip control unit may be configured to: receive the authentication request sent by the image forming apparatus, obtain the second time information, generate the second code by performing a calculation using a preset algorithm according to the second time information and the pre-stored identity authentication information of the consumable, and send the second code to the image forming apparatus. The second code may be configured to determine whether the consumable meets expectation.

The second time information may correspond to the time when the image forming apparatus sends the authentication request. After the chip control unit sends the second code to the image forming apparatus, the image forming control unit may determine whether the second code is invalid. If the second code is invalid, the chip control unit may receive the authentication request sent by the image forming apparatus again, to obtain the second time information. The identity authentication information of the consumable may include consumable serial number, consumable production date, consumable ID, consumable production batch number, consumable type information, consumable color characteristic information, consumable capacity information, imaging date, consumable remaining amount, consumable consumption and manufacturer information, etc.

In one embodiment, the consumable may be provided with a timer for timing, and the chip control unit may acquire the second time information from the timer provided in the consumable. The second time information may be the time for the chip control unit to receive the authentication request. It should be understood that in certain embodiments, the second time information used for calculating the second code this time may also be time information obtained in the last power-on cycle of the chip control unit. One power-on cycle may refer to the time period from when the image forming apparatus is connected to the power supply until the image forming apparatus is disconnected from the power supply.

In this embodiment, when the system clock is set on the consumable chip, the system clock starts when the consumable chip is started, timing the time from the startup of the consumable chip to the time when the authentication request is received. When authentication is required, this time information is taken as the second time information. When the second, third and subsequent authentication are required, the system time information during the second, third and subsequent authentication is taken as the second time information to calculate the second code.

In this embodiment, when the consumable is provided with a timer for timing, the timer counts the time from the consumable chip power-on to the receipt of the authentication request. When authentication is required, the information at this time is taken as the second time information to calculate the second code.

In this embodiment, the consumable chip can also unify a fixed time base with the image forming apparatus. For example, when authentication is required, a fixed moment of a certain day is used as the second time information. For example, the time of two o'clock in the afternoon of every day is used as the first time information to calculate the second code.

Further, when the image forming apparatus and the consumable are provided with timers, respectively, the image forming apparatus may obtain the first time information from the timer provided in the image forming apparatus, where the first time information may be the time when the image forming apparatus sends the authentication request. The chip control unit may receive the first time information sent by the image forming apparatus and may obtain the second time information from the timer provided in the chip control unit, and may determine the error between the first time information and the second time information. When the error is less than a preset value, for example, when the error is less than 100 ms, the chip control unit may configure the time obtained from the timer provided in the consumable as the second time information (the second time information may be the time when the chip control unit receives the authentication request), which may be configured to calculate the second code this time. Alternatively, the second code may be calculated using the time information obtained in the last power-on cycle of the chip control unit.

When the error is greater than or equal to the preset value, the first time information sent by the image forming apparatus may be configured as the second time information, which may be used to calculate the second code this time. In view of this, the image forming apparatus may need to obtain the first time information again, and may send the authentication request and the obtained first time information to the consumable chip again. The consumable chip may configure the first time information sent by the image forming apparatus as the second time information. In other words, the second time information used to calculate the second code this time may be re-acquired. One power-on cycle may refer to the time period from when the image forming apparatus is connected to the power supply until the image forming apparatus is disconnected from the power supply.

In the present disclosure, by determining the error between the first time information and the second time information, it may be determined whether the chip control unit uses the time sent by the image forming apparatus to calculate the code, or uses the time obtained by the consumable to calculate the code, to avoid the wrong time determined by the consumable chip, which may affect the authentication result. At the same time, when the error is smaller than the preset value, the time information obtained by the chip control unit in the last power-on cycle may be used to generate the second code, to avoid the process of recalculating the code and to speed up the authentication process.

It should be understood that in certain embodiments, the consumable may not be provided with a timer for timing. The image forming control unit may send the authentication information and the first time information to the chip control unit. The chip control unit may receive the first time information sent by the image forming apparatus, and may configure the first time information as the second time information for generating the second code by calculating. One of the realization possible ways, the first time information sent by the image forming apparatus may be the time when the image forming apparatus sends the authentication request to the consumable chip. In another possible realization way, the first time information sent by the image forming apparatus can also be a certain time determined by other means, which is not limited here.

The method for the chip control unit to generate the second code by calculating may be similar to the method for the image forming control unit to generate the first code by calculating, which may not be described herein.

Based on the above-mentioned embodiments, the present disclosure also provides a consumable. The consumable may include a housing, a developer container unit, and the consumable chip in any of the above-disclosed embodiments. Moreover, the consumable may include a developer conveying unit. Further, the consumable may include an organic photoconductor and a charging roller.

The present disclosure also provides a consumable. The consumable may include an organic photoconductor, a charging roller, and the consumable chip in any of the above-disclosed embodiments.

The developer container unit may be configured to contain the developer. The developer conveying unit may be configured to convey the developer. The charging roller may be configured to charge the organic photoconductor.

Figure 4:
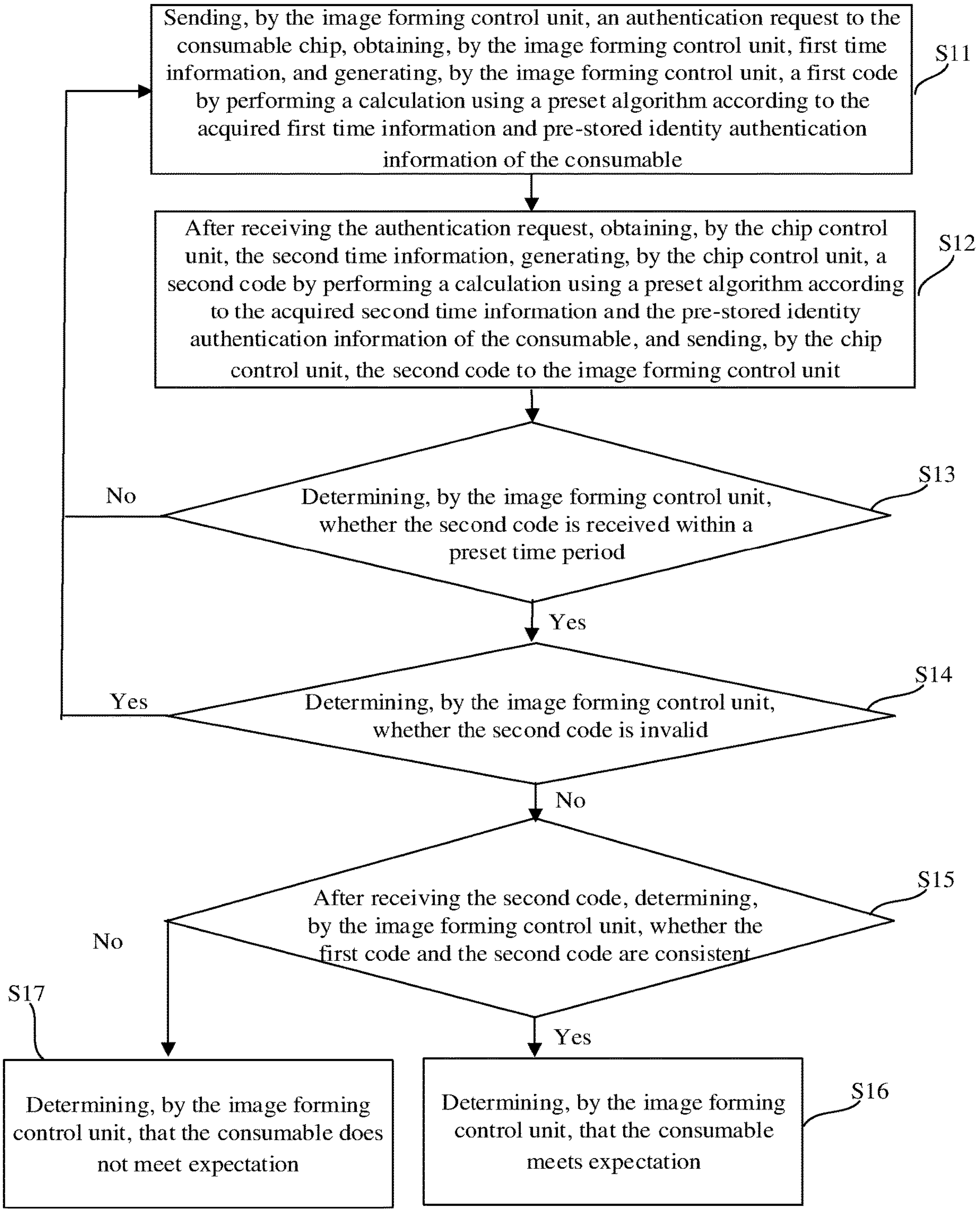
FIG. 4 illustrates a schematic flowchart of an exemplary communication method between an image forming apparatus and a consumable chip consistent with an embodiment of the present disclosure.

Based on the above-disclosed embodiments, referring to FIG. 4, the present disclosure also provides a communication method between an image forming apparatus and a consumable chip, which may be applied to the image forming apparatus and the consumable chip. The image forming apparatus may be detachably installed with the consumable, and the consumable may be installed with the consumable chip. The image forming apparatus may include an image forming control unit, and the consumable chip may include a chip control unit. The communication method may include following.

S11: sending, by the image forming control unit, an authentication request to the consumable chip, obtaining, by the image forming control unit, first time information, and generating, by the image forming control unit, a first code by performing a calculation using a preset algorithm according to the acquired first time information and pre-stored identity authentication information of the consumable.

In one embodiment, the image forming control unit may determine whether the acquired first time information is 6-byte aligned. If the acquired first time information is 6-byte aligned, the image forming control unit may convert the acquired first time information to 8-byte data. If the acquired first time information is not 6-byte aligned, the 6-byte alignment may be first performed to make the first time information be 6-byte aligned, and then the first time information may be converted to 8-byte data. In one embodiment, the service life information of the consumable may be used to perform the 6-byte alignment on the first time information, which may not be limited by the present disclosure.

The image forming control unit may combine the first 8 bytes of data of the identity authentication information of the consumable and the 8 bytes of data of the first time information to obtain a 16-byte key. The first 16 bytes of the serial number of the consumable may be configured as plaintext data, and the plaintext data and the 16-byte key may be encrypted to obtain ciphertext. The first 6 bytes of the ciphertext may be filled up to obtain the first code of the 8-byte data.

The image forming apparatus may be provided with a timer for timing, and the image forming control unit may acquire the first time information from the timer provided in the image forming apparatus. The first time information may be the time for the image forming apparatus to send the authentication request. In certain embodiments, the first time information may also be time information obtained by the image forming control unit in the last power-on cycle.

S12: after receiving the authentication request, obtaining, by the chip control unit, the second time information, generating, by the chip control unit, a second code by performing a calculation using a preset algorithm according to the acquired second time information and the pre-stored identity authentication information of the consumable, and sending, by the chip control unit, the second code to the image forming control unit.

In one embodiment, the chip control unit may determine whether the acquired second time information is 6-byte aligned. If the acquired second time information is 6-byte aligned, the chip control unit may convert the acquired second time information to 8-byte data. If the acquired second time information is not 6-byte aligned, the 6-byte alignment may be first performed to make the second time information be 6-byte aligned, and then the second time information may be converted to 8-byte data. In one embodiment, the service life information of the consumable may be used to perform the 6-byte alignment on the second time information, which may not be limited by the present disclosure.

The chip control unit may combine the first 8 bytes of data of the identity authentication information of the consumable and the 8 bytes of data of the second time information to obtain a 16-byte key. The first 16 bytes of the serial number of the consumable may be configured as plaintext data, and the plaintext data and the 16-byte key may be encrypted to obtain ciphertext. The first 6 bytes of the ciphertext may be filled up to obtain the second code of the 8-byte data.

The consumable may be provided with a timer for timing, and the chip control unit may acquire the second time information from the timer provided in the consumable. The second time information may be the time for the chip control unit to receive the authentication request. The error between the second time information and the first time information may be less than the preset value.

In another embodiment, the chip control unit may acquire the second time information from a timer provided in the consumable, may receive the first time information corresponding to the authentication request sent by the image forming apparatus, and may determine the error between the first time information and the second time information. When the error is less than the preset value, the chip control unit may configure the time information obtained by the chip control unit in the last power-on cycle as the second time information for generating the second code this time. When the error is greater than or equal to the preset value, the chip control unit may configure the first time information sent by the image forming apparatus as the second time information for calculating the second code this time.

In another embodiment, the consumable may not be provided with a timer, and the chip control unit may acquire the second time information from the image forming apparatus. In other words, the image forming control unit may send the first time information to the chip control unit, and the chip control unit may configure the received first time information sent by the image forming control unit as the second time information, to generate the second code by calculating. The first time information may be the time when the image forming apparatus sends the authentication request to the consumable chip.

S13: determining, by the image forming control unit, whether the second code is received within a preset time period, and if the image forming control unit does not receive the second code within the preset time period, S11 may be performed again, and if the image forming control unit receives the second code within the preset time period, S14 may be performed.

S14: determining, by the image forming control unit, whether the second code is invalid, if the second code is invalid, S11 may be performed again, and if the second code is valid, S15 may be performed.

In one embodiment, the second code may have an expiration date. After passing the expiration date, the chip control unit may need to receive the authentication request sent by the image forming apparatus again, and may acquire the second time information again to calculate the second code. If the second code used for authentication does not have an expiration date, the code information may tend to be leaked due to the long use period, or may be obtained by others. Through adding an expiration date used for the second code, the code information may be dynamic and updatable, which may improve the security and reliability when the consumable is authenticated by the image forming apparatus.

S15: receiving, by the image forming control unit, the second code, and determining, by the image forming control unit, whether the first code and the second code are consistent, if the first code and the second code are consistent, S16 may be performed, and if the first code and the second code are not consistent, S17 may be performed.

S16: determining, by the image forming control unit, that the consumable meets expectation.

S17: determining, by the image forming control unit, that the consumable does not meet expectation.

The identity authentication information of the consumable may include consumable serial number, consumable production date, consumable ID, consumable production batch number, consumable type information, consumable color characteristic information, consumable capacity information, imaging date, consumable remaining amount, consumable consumption and manufacturer information, etc.

Further, the image forming apparatus and the consumable may generate the first code and the second code according to the preset identity authentication information related to the consumable, respectively. When the first code and the second code are consistent, it may be determined that the consumable meets expectation and may be installed on the image forming apparatus for use. In view of this, the image forming apparatus may authenticate the designated consumable that meets the quality, and then the designated consumable that does not meet the predetermined quality may not be certified and used, which may prevent the damage of the image forming apparatus and the degradation in output quality of the image forming apparatus caused by the use of any other consumable (e.g., counterfeit and shoddy consumable) that cannot meet the predetermined quality, and may prevent the risk of long authentication time and password leakage.

In the present disclosure, the image forming apparatus and the consumable may be synchronized with the same time parameter. The time parameter information and the preset identity authentication information may be used to generate the code by performing a calculation using preset algorithm, which may serve as the communication data between the image forming apparatus and the consumable chip, thereby enhancing the difficulty of analyzing the communication data and improving the security and reliability of the image forming apparatus when authenticating the consumable. The image forming apparatus may generate the first code by performing a calculation using the acquired time parameter information and the pre-stored identity authentication information of the consumable, and the consumable chip may generate the second code by performing a calculation using the acquired time parameter information and the pre-stored identity authentication information of the consumable. By comparing whether the first code generated by the image forming apparatus and the second code generated by the consumable chip are consistent, the image forming apparatus may authenticate the consumable, to ensure that the used consumable is a designated consumable that meets the predetermined quality, thereby improving the output quality of the image forming apparatus, and reducing the damage of the image forming apparatus and the degradation in output quality caused by the use of any other consumable that cannot meet the predetermined quality.

The above-disclosed image forming apparatus may include but may not be limited to a printer, a copier, a facsimile machine, a scanner, and an all-in-one multifunctional machine that integrates functions such as printing, copying, faxing, and scanning. The function of the image forming apparatus may include printing an image or text on an imaging medium.

The above-disclosed consumable may be a replaceable consumable for imaging installed on the image forming apparatus. The consumable of the image forming apparatus may often include a drum cartridge, a toner hopper, an ink cartridge, a toner cartridge, paper, and developing cartridge.

The consumable chip may be configured to record the state of the consumable to facilitate the image forming apparatus to centrally manage the consumables installed thereon, and the consumable may be installed with a corresponding consumable chip. The consumable chip may store related information of the consumable, such as product model, color/type and production date of a recording material (such as ink, toner), etc. At the same time, the consumable chip may communicate with the image forming apparatus, and the image forming apparatus may authenticate the consumable chip using the communication information, to prevent the consumable that cannot meet the predetermined quality from being installed on the image forming apparatus, and may ensure that the installed consumable is the designated consumable that meets the predetermined quality.

The disclosed embodiments may have following beneficial effects. When the image forming apparatus authenticates the consumable chip, the image forming control unit may be configured to send the authentication request to the consumable chip and obtain the first time information, generate the first code by performing a calculation using a preset algorithm according to the obtained first time information and the pre-stored identity authentication information of the consumable, and receive the second code fed back by the consumable chip. The second code may be generated by performing a calculation using a preset algorithm according to the second time information obtained by the consumable chip and the pre-stored identity authentication information of the consumable. The image forming control unit may also be configured to determine whether the first code and the second code are consistent, to determine whether the consumable meets expectation. Compared with the existing authentication information generated merely by identity authentication information, random code or random number, in the present disclosure, the security may be substantially higher and the authentication process may be more reliable.

It should be noted that the disclosed embodiments are merely examples for illustrating the technical solutions of the present disclosure, but are not limited thereto. Although the present disclosure has been described in detail with reference to the foregoing embodiments, those skilled in the art should understand that the technical solutions described in the foregoing embodiments can still be modified, or equivalently replace some or all of the technical features.

Such modification or replacement thereof does not depart from the spirit and principle of the present disclosure, and falls within the true scope of the present disclosure.

What is claimed is:

1. A consumable chip, wherein the consumable chip is capable of being installed on a consumable, the consumable is capable of being detachably installed on an image forming apparatus, and the consumable chip comprising: a chip control unit, configured to:

receive an authentication request sent by the image forming apparatus and provide a second code to the image forming apparatus, the second code is configured to determine whether the consumable meets expectation, and wherein, the second code is the same as the result calculated by the preset algorithm based on the second time information and the consumable identity authentication information, the second time information is the time information determined by the consumable chip itself or the time information obtained by the consumable chip from the image forming apparatus.

2. The consumable chip according to claim 1, wherein the second code information is specifically used to compare with the first code information determined by the image forming apparatus to determine whether the consumable meets expectation.

3. The consumable chip according to claim 2, wherein the first code information is the result generated by the image forming apparatus based on the first time information and the consumable identity authentication information using a preset algorithm, and the difference between the second time information and the first time information is less than the preset value.

4. The consumable chip according to claim 1, wherein the second time information is the time information when the consumable chip receives the authentication request, or the second time information is the time information contained in the authentication request, or the second time information is the time information when the image forming apparatus sends an authentication request to the consumable chip, or the second time information is the time information obtained by the chip control unit in the last power-on cycle.

5. A consumable, comprising:

a housing;

a developer container unit, disposed in the housing and configured to contain the developer; and a consumable chip, wherein the consumable chip is capable of being installed on a consumable, the consumable is capable of being detachably installed on an image forming apparatus, and the consumable chip comprising:

a chip control unit, configured to:

receive an authentication request sent by the image forming apparatus and provide a second code to the image forming apparatus, the second code is configured to determine whether the consumable meets expectation, and wherein, the second code is the same as the result calculated by the preset algorithm based on the second time information and the consumable identity authentication information, the second time information is the time information determined by the consumable chip itself or the time information obtained by the consumable chip from the image forming apparatus.

6. The consumable according to claim 5, further including:

a developer conveying unit, configured to convey the developer.

7. The consumable according to claim 6, further including:

an organic photoconductor, and a charging roller, configured to charge the organic photoconductor.

8. A consumable, comprising:

an organic photoconductor, a charging roller, configured to charge the organic photoconductor, and a consumable chip, wherein the consumable chip is capable of being installed on a consumable, the consumable is capable of being detachably installed on an image forming apparatus, and the consumable chip comprising:

a chip control unit, configured to:

receive an authentication request sent by the image forming apparatus and provide a second code to the image forming apparatus, the second code is configured to determine whether the consumable meets expectation, and wherein, the second code is the same as the result calculated by the preset algorithm based on the second time information and the consumable identity authentication information, the second time information is the time information determined by the consumable chip itself or the time information obtained by the consumable chip from the image forming apparatus.

9. A communication method between an image forming apparatus and a consumable chip, applied to the consumable chip, the image forming apparatus being detachably installed with a consumable, the consumable being installed with the consumable chip, the image forming apparatus including an image forming control unit, the consumable chip including a chip control unit, and the communication method comprising:

receiving an authentication request sent by the image forming control unit;

a second code is sent to the image forming control unit, the second code is configured to determine whether the consumable meets expectation;

wherein, the second code information is the same as the result calculated by the preset algorithm based on the second time information and the consumable identity authentication information, the second time information is the time information determined by the consumable chip itself or the time information obtained by the consumable chip from the image forming apparatus.

10. The method according to claim 9, wherein the second code information is specifically used to compare with the first code information determined by the image forming apparatus to determine whether the consumable meets expectation.

11. The method according to claim 10, wherein the first code is the result generated by the image forming apparatus based on the first time information and the consumable identity authentication information using a preset algorithm, and the difference between the second time information and the first time information is less than the preset value.

12. The method according to claim 9, wherein the second time information is the time information when the consumable chip receives the authentication request, or the second time information is the time information contained in the authentication request, or the second time information is the time information when the image forming apparatus sends an authentication request to the consumable chip, or the second time information is the time information obtained by the chip control unit in the last power-on cycle.

* * * * *